United States Patent [19]

Bachelet et al.

[11] Patent Number: 5,244,297
[45] Date of Patent: Sep. 14, 1993

[54] PROCESS FOR MANUFACTURING PENCIL BY TRI-EXTRUSION AND THE PRODUCED PENCIL HAVING AN INTERMEDIATE PROTECTIVE CASING

[75] Inventors: Jacques Bachelet, Cremarest; Philippe Chavatte, Wimereux; Guy Chochoy, Saint Leonard; José Duez, Boulogne sur Mer; Claude Fouble, Ostrohove; Didier Lange, Saint Leonard, all of France

[73] Assignee: Conte S.A., France

[21] Appl. No.: 25,825

[22] Filed: Mar. 3, 1993

Related U.S. Application Data

[63] Continuation of Ser. No. 848,169, Mar. 10, 1992, abandoned.

[30] Foreign Application Priority Data

Mar. 19, 1991 [FR] France .................. 91 03464

[51] Int. Cl.$^5$ .................. B43K 19/14; B43K 19/18
[52] U.S. Cl. .................................................. 401/96
[58] Field of Search .......................................... 401/96

[56] References Cited

U.S. PATENT DOCUMENTS

| 2,790,202 | 4/1957 | Lorenian | 18/13 |
| 3,625,788 | 7/1971 | Bartner | 156/78 |
| 3,704,071 | 11/1972 | Muller et al. | 401/96 |
| 4,176,978 | 12/1979 | Ruzicka et al. | 401/96 |

FOREIGN PATENT DOCUMENTS

| 494026 | 12/1976 | Australia | 401/96 |
| 969976 | 12/1950 | France | 401/96 |
| 52-70618 | 6/1977 | Japan | 401/96 |
| 54-31316 | 3/1979 | Japan | 401/96 |
| 54-18382 | 7/1979 | Japan | 401/96 |
| 554 | of 1899 | United Kingdom | 401/96 |
| 1240852 | 7/1971 | United Kingdom | 401/96 |

Primary Examiner—Steven A. Bratlie
Attorney, Agent, or Firm—Ladas & Parry

[57] ABSTRACT

According to the invention, the writing or coloring pencil is obtained by tri-extrusion of three thermoplastic materials forming the lead material, the expanded wood material and an intermediate protective layer, containing no expanding agent, which is compatible with the lead material and the wood material and has a melting point which is equal to or higher than the melting points of the lead material and the wood material. The three co-extruded materials all contain in particular the same basic component, such as for example a polystyrene-methacrylate copolymer. The protective layer can be of a different color from the other two layers. The writing or coloring pencil with protective casing between the lead and the expanded wood, all three being in thermoplastic material, is, in particular a pencil with soft or extra-soft lead.

10 Claims, 1 Drawing Sheet

PROCESS FOR MANUFACTURING PENCIL BY TRI-EXTRUSION AND THE PRODUCED PENCIL HAVING AN INTERMEDIATE PROTECTIVE CASING

This is a continuation of copending application Ser. No. 07/848,169 filed on Mar. 10, 1992 now abandoned.

FIELD OF THE INVENTION

The present invention relates to a method for continuously manufacturing a writing or coloring pencil, by simultaneous extrusion of thermoplastic materials constituting successively, on the one hand the lead, and on the other hand the material enveloping the lead, and which is hereinafter called wood material by analogy with the composition of the conventional pencils in which said material is made of wood. The invention also relates to a writing or coloring pencil, which is obtainable with the method according to the invention.

BACKGROUND OF THE INVENTION

The conventional pencils are manufactured by depositing a graphite or pigmented lead inside a wood casing. The limited selection of suitable woods, the treatments that they have to undergo, the complexity of the steps of the manufacturing and finishing method are known to be major disadvantages. Moreover, the trees from which the wood comes are an important component of natural balance and excessive elimination of these can but affect such balance.

It has already been proposed to simplify the technique used for manufacturing writing pencils by replacing the actual wood with a thermoplastic material selected for its properties of sharpenability which have to be comparable to wood.

In U.S. Pat. No. 2,790,202, said wood material is extruded around a rigid preformed lead, optionally coated with an adhesive in order to improve adherence between the lead and the wood material.

According to a variant embodiment of said U.S. patent, the lead is obtained by extruding a thermoplastic material containing a filler, and the wood material is co-extruded around the lead.

French Patent No. 1 588 294 proposes to produce the lead from a thermoplastic material containing a filler, such as a graphite filled material, and to envelope it with a wood material containing an expanding agent, i.e. a substance whose decomposition occurs within the range of temperatures at which the extrusion of the wood material is performed.

The first role of the expanding agent is to reduce the density of the wood material, the object being to arrive as near as possible to the density of wood itself, which is around 0.5. Moreover, such use of an expanding agent improves the sharpenability of the wood material and reduces its cost.

French Patent No. 2 099 248 describes a method, which is particularly applicable to the continuous manufacture of writing pencils, in which the sheathing with the wood material is performed immediately as the lead material emerges from the outlet of the extrusion die. The technique used here is that of bi-extrusion.

It is easily understood that such a type of method presents very great advantages over the manufacturing methods of the conventional pencils: continuous manufacture, better control of the raw materials, higher productivity.

Nonetheless, the applicant has found that the manufacture of writing pencils which uses bi-extrusion with thermoplastic materials of the type of those recommended in French Patent No. 1 588 294 was particularly restrictive.

Indeed, defects have been noted during the manufacture of certain types of pencils, which defects consist in the presence of bubbles on the outer periphery of the lead material. Such defects are redhibitory as they reduce the strength of the lead and moreover they are detrimental to the appearance of the sharpened pencil.

OBJECT OF THE INVENTION

It is the object of the invention to propose a method for continuously manufacturing writing or coloring pencils of the type of that described in French Patent No. 1 588 294, and using poly-extrusion which has none of the aforesaid disadvantages.

According to the present invention, a method for continuously manufacturing a writing or coloring pencil comprises coextruding in one coextrusion head a lead material which is a first thermoplastic material containing a filler, and covering said lead material with a layer of wood material which is a second coextruded thermoplastic material containing an expanding agent, wherein the coextruded lead material is, prior to receiving its casing of the wood material, enveloped in an intermediate protective layer produced by coextruding a further thermoplastic material which contains no expanding agent, and is compatible with the lead material and the wood material and has a melting point which is equal to or higher than both the melting points of the lead material and of the wood material, such that the thermoplastic material constituting the protective layer is less fluid than the lead and wood materials at the temperature of the coextrusion.

A writing or coloring pencil of this invention is constituted in a coextrusion processing by the superposition of a core of a lead material which is a first thermoplastic material containing a filler and of a layer of a second thermoplastic material containing an expanding agent. The pencil comprises an intermediate protective layer between the lead material and the wood material, intermediate layer including non-expanded thermoplastic material, being compatible with the lead material and the wood material and having a melting point which is equal to or higher than both the melting points of the lead material and of the wood material such that the thermoplastic material constituting the protective layer is less fluid than the lead and wood materials at the temperature of the coextrusion.

Accordingly, the protective layer covers the lead material immediately after extrusion thereof and forms a protective barrier against pollution caused by the expanding agent contained in the wood material. It has indeed been found by the applicant that the appearance of defects could be due to the gas bubbles released during the extrusion of the wood material in contact with the lead material. Consequently, the presence of said protective layer, which contains no expanding agents, prevents the direct formation of gas bubbles on the periphery of the lead material.

Compatibility of the thermoplastic material, constituting the protective layer, with the lead and wood materials is important for the lead to be properly held in the pencil.

The method according to the invention is particularly advantageous for manufacturing soft lead pencils, of which the lead material has a melting point substantially lower than that of the wood material. Indeed, it has been found that the bubble defects are more frequent with this type of pencils, contrary to hard lead pencils in which said defects are very scarce if not non-existent.

According to the applicant, this phenomenon could be explained by the fact that the components used in the lead material to obtain a hard lead according to the normal classification of writing or coloring pencils, have altogether a melting point which is substantially equal to the temperature of the wood material. In the case of a soft lead, on the contrary, the lead material has a melting point which is definitely lower than that of the wood material, the difference reaching up to several dozens of degrees. Given that the temperature of the bi-extrusion head is close to the highest melting point, the lead material is more fluid when it emerges from the extruding die and is therefore readily deformable under the effect of the bubbles released on the surface of the wood material.

In the method according to the invention, the thermoplastic material constituting the protective layer is, because of its melting point, less fluid than the lead and wood materials; therefore it is not deformable under the effect of the bubbles released on the surface of the wood material, and it does constitute a protective barrier for the lead material.

It is another object of the present invention to claim a writing or coloring pencil which can be obtained with the aforedescribed manufacturing method.

In known manner, said pencil is constituted by the superposition of a core in a first thermoplastic material containing a filler and called lead material and of a layer of a second expanded thermoplastic material which is called wood material.

Characteristically, the pencil according to the invention includes an intermediate layer, called protective layer, between the lead material and the wood material, which intermediate layer is in non-expanded thermoplastic material, adhering to the lead material and to the wood material and having a melting point which is equal to or higher than both the melting points of the lead material and of the wood material.

According to a first variant of embodiment, the protective layer is in the second thermoplastic material constituting the wood material, but without it being expanded.

Advantageously, the protective layer is in the form of a casing of several tenths of a millimeter thickness. Thus, the presence of this casing, which is not expanded, does not substantially increase the density of the pencil. What is more, it has been found that the sharpenability of the pencil did reduce with a thicker protective layer.

Preferably, the lead material, the wood material and the thermoplastic material constituting the protective layer, all three contain the same basic component which may be, for example, a polystyrene-methacrylate copolymer. This affords a very good compatibility hence a perfect adherence.

Preferably, in this case, the protective layer is produced from said component in pure state or from a mixture containing at least 90% of said component.

The protective layer can have the color of the wood material, or else another color, which is an advantage from a decorative point of view.

BRIEF DESCRIPTION OF THE DRAWINGS

The invention will be more readily understood on reading the following description of one embodiment of the method for manufacturing a writing or coloring pencil by tri-extrusion of thermoplastic materials and of the pencil with three successive layers obtained according to said method, illustrated by the accompanying drawing, in which.

DETAILED DESCRIPTION OF PREFERRED EMBODIMENT

The techniques of poly-extrusion are wellknown to the man skilled in the art. The materials used are for example of the type described in French Patent No. 2 099 248 for bi-extrusion, applied to the continuous manufacture of writing pencils.

Figure 1:
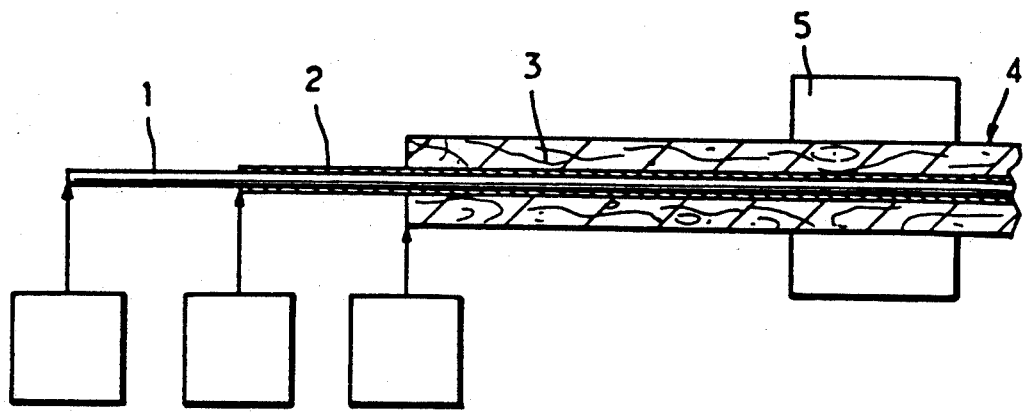
FIG. 1 is a diagram illustrating the tri-extrusion steps.

Consequently, FIG. 1 is merely a diagram of a tri-extrusion of three layers of thermoplastic materials, respectively a central core, an intermediate layer and an outer layer.

According to the present invention, the central core constitutes the lead material 1, the intermediate layer constitutes the protective layer 2 and the outer layer constitutes the wood material 3 of a pencil 4 manufactured in continuous manner.

The composition of thermoplastic materials is so determined that each corresponding element has the properties expected of it: the whole pencil should have a good sharpenability, and a density close to that of a conventional wood pencil, the lead material should include writing fillers and be readily transferable on the writing or coloring base material in order to have a good covering power. The corresponding components are, for example, selected from those described in French Patent No. 1.588.294.

In addition, the wood material 3 contains an expanding agent, such as for example, azodicarbonamide, and the expanding agent-free protective layer 2 must be compatible with both the lead material 1 and the wood material 2 so as to ensure that the lead is firmly secured in the pencil, and it must have a melting point which is equal to or higher than both the melting points of the lead material and of the wood material.

Preferably, the thermoplastic materials constituting these three elements 1, 2, 3 have the same constituent as base material. In the examples described hereinafter, this constituent is a polystyrene-methacrylate copolymer.

EXAMPLE 1

The pencil 4 is a pencil with soft lead in graphite.

The composition of the lead material 1 is as follows:
polystyrene-methacrylate copolymer: 30%
phtalate-type plastifying agent: 10%
graphite: 50%
carbon black: 5%
zinc stearate: 0.5%
talc: 4.5%

The composition of the protective layer 2 is as follows:
polystyrene-methacrylate copolymer: 100%

The composition of the wood material 3 is as follows:
polystyrene-methacrylate copolymer: 78.5%
phtalate-type plastifying agent: 10% sawdusts: 10%
pigments (master-batch): 1.5%

Just before extrusion, about 2% of a master mixture containing azodicarbonamide as expanding agent are mixed with the wood material.

The melting point of the wood material is around 200° C., that of the protective layer 2 around 210° C. and that of the lead material around 180° C.

After tri-extrusion and continuous passage in a cooling jig 5, a pencil 4 of hexagonal configuration is obtained which, once sharpened (FIG. 2) reveals between the lead material 1 and the wood material 3, the protective casing 2 which, in the illustrated example, had a thickness of 0.3 mm for a pencil 4 of about 7 mm between flat areas and a lead 1 of about 2 mm diameter.

The lead in the present example is a soft lead and it has no bubbles on the surface liable to affect its strength and its appearance To obtain a hard lead pencil, the plastifying agent of phtalate type should have been omitted from the composition of the lead material 1, and replaced with polystyrene-methacrylate copolymer. In this case, the melting point of the lead material would have been around 210° C., and the bubble defects would have been scarce, if not non-existent.

EXAMPLE 2

The pencil 4 is a color pencil with soft lead.

The wood material 3 and the protective layer 2 are unchanged.

The composition of the lead material 1 is as follows:
polystyrene-methacrylate copolymer: 30%
phtalate-type plastifying agent: 15%
colored pigments: 20%
zinc stearate: 0.5%
talc: 35%

Its melting point is around 180° C.

In addition to the already explained advantages, the applicant has found that, thanks to the protective casing, all the types of writing or coloring pencils could be produced, including pencils with extra-soft leads. In this case, the protective casing which, here, preferably has a thickness at least equal to 0.5 mm, acts as a reinforcement for the lead material, which reinforcement reduces very considerably the risks of breaking the lead when this is used.

Figure 2:
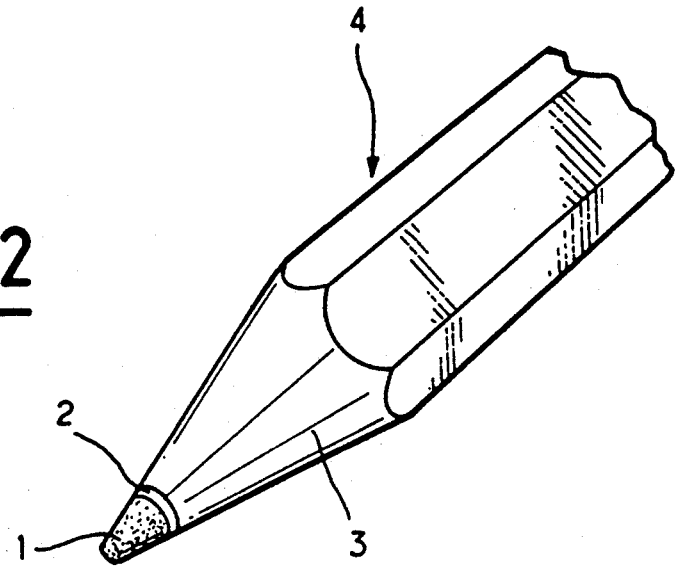
FIG. 2 is a perspective view of the pencil provided with a protective layer according to the invention.

The invention is not limited to the example of embodiment described hereinabove, but on the contrary covers all variants. For example, the protective layer according to the invention can be visible as illustrated in FIG. 2; it can also be colored so as not to be visible. In the aforesaid example, a component in pure state has been used, but said component can be a mixture, such as that composing the expanding agent-free wood material. Other base components than polystyrene-methacrylate copolymer can also be used.

The pencil can be given any other shapes than the hexagonal shape; it can be of circular, triangular, or octogonal shape without this list being in any way exhaustive.

What is claimed is:

1. A method for continuously manufacturing a writing or coloring pencil, consisting in coextruding in one coextrusion head a lead material which is a first thermoplastic material containing a filler, and covering said lead material with a layer of wood material which is a second coextruded thermoplastic material containing an expanding agent, wherein the coextruded lead material is, prior to receiving its casing of the wood material, enveloped in an intermediate protective layer produced by coextruding a further thermoplastic material which contains no expanding agent, and is compatible with the lead material and the wood material and has a melting point which is equal to or higher than both the melting points of the lead material and of the wood material, such that the thermoplastic material constituting the protective layer is less fluid than the lead and wood materials at the temperature of the coextrusion.

2. The method as claimed in claim 1, wherein it is used for manufacturing soft lead pencils, of which the lead material has a melting point substantially lower than that of the wood material.

3. A writing or coloring pencil, constituted in a coextrusion processing by the superposition of a core of a lead material which is a first thermoplastic material containing a filler and of a layer of wood material which is a second thermoplastic material containing an expanding agent, said pencil comprising an intermediate protective layer between the lead material and the wood material, intermediate layer including non-expanded thermoplastic material, being compatible with the lead material and the wood material and having a melting point which is equal to or higher than both the melting points of the lead material and of the wood material, such that the thermoplastic material constituting the protective layer is less fluid than the lead and wood materials at the temperature of the coextrusion.

4. The pencil as claimed in claim 3, wherein the protective layer is made from the second thermoplastic material, constituting the wood layer, but not being expanded.

5. The pencil as claimed in claim 3, wherein the protective layer is a casing of a thickness of at least three tenths of a millimeter.

6. The pencil as claimed in claim 3, wherein the lead material, the wood material and the thermoplastic material constituting the protective layer all contain the same basic component.

7. The pencil as claimed in claim 6, wherein the basic component is a polystyrene-methacrylate copolymer.

8. The pencil as claimed in claim 6 or 7, wherein the protective layer is produced from a mixture containing at least 90% of said component.

9. The pencil as claimed in claim 3, wherein the protective layer is of a different color from the wood material.

10. The pencil as claimed in claim 3, wherein the lead material is of extra-soft quality, and the protective layer has a thickness of at least five tenths of a millimeter.

* * * * *